United States Patent [19]
Ando et al.

[11] Patent Number: 5,351,577
[45] Date of Patent: Oct. 4, 1994

[54] CONTROL SYSTEM FOR SERVO HYDRAULIC PRESSURE OF TWO FRICTION ENGAGING MEANS DURING AN N-R SHIFT IN AUTOMATIC TRANSMISSION

[75] Inventors: Masahiko Ando, Okazaki; Koji Noda, Anjo; Yoshihisa Yamamoto, Nishio; Masahiro Hayabuchi, Anjo; Kazumasa Tsukamoto, Toyota; Yasuo Hojo, Nagoya; Yutaka Taga; Hidehiro Oba, both of Aichi, all of Japan

[73] Assignees: Aisin AW Co., Ltd.; Toyota Jidosha Kabushiki Kaisha, both of Japan

[21] Appl. No.: 982,679

[22] Filed: Nov. 27, 1992

[30] Foreign Application Priority Data

Dec. 3, 1991 [JP] Japan .................. 3-344121

[51] Int. Cl.$^5$ .................. F16H 61/04; F16H 61/08
[52] U.S. Cl. .................. 477/11.6; 477/148
[58] Field of Search .................. 74/867, 868, 869

[56] References Cited

U.S. PATENT DOCUMENTS

| | | | |
|---|---|---|---|
| 4,346,626 | 8/1982 | Kawamoto | 74/867 X |
| 5,078,028 | 1/1992 | Ishikawa et al. | 74/868 |
| 5,088,357 | 2/1992 | Kamada et al. | 74/868 |
| 5,113,724 | 5/1992 | Hayasaki | 74/867 |
| 5,224,399 | 7/1993 | Baba et al. | 74/867 |

FOREIGN PATENT DOCUMENTS 57-37140 3/1982 Japan .
62-17458 11/1987 Japan .
1153850 6/1989 Japan .

Primary Examiner—Leslie A. Braun
Assistant Examiner—Khoi Ta
Attorney, Agent, or Firm—Lorusso & Loud

[57] ABSTRACT

A control system is provided for servo hydraulic pressure in an automatic transmission having planetary gear mechanisms. Shifting elements of the mechanisms can be connected to establish a different power flow in accordance with engagement or release of frictional engagement devices under the control of servo hydraulic pressure to achieve plural speed stages. The system comprises first and second frictional engagement devices engageable simultaneously in a reverse range, first and second servo pressure feed lines for feeding servo hydraulic pressure to the devices, a regulator valve disposed in the first line, a solenoid for controlling the valve, an electronic control unit for outputting a signal to the solenoid, and a detector for detecting shifting to the reverse range. The valve is controlled by the solenoid in accordance with an output from the unit upon detection of shifting to the reverse range by the detector, whereby engagement of the first device is coincided with that of the second device.

4 Claims, 5 Drawing Sheets

FIG. 3

| | Solenoid | | | | | Clutch | | | | Brake | | | | | One-way clutch | | |
|---|---|---|---|---|---|---|---|---|---|---|---|---|---|---|---|---|---|
| | No. 1 | No. 2 | No. 3 | No. 4 | L-up | C-0 | C-1 | C-2 | B-0 | B-1 | B-2 | B-3 | B-4 | F-0 | F-1 | F-2 |
| P | ○ | × | ○ | × | × | × | × | × | × | × | × | × | ○ | ○ | × | × |
| R  V<Vo | ○ | × | × | ○ | × | × | × | ○ | ○ | × | × | × | ○ | × | × | × |
| R  V≥Vo | ○ | ○ | × | ○ | × | × | × | ○ | ○ | × | × | × | × | × | × | × |
| N | ○ | × | ○ | × | × | × | × | × | × | × | × | × | ○ | ○ | × | × |
| D 1ST | ○ | × | ○ | ⊗ | × | ○ | ○ | × | × | × | × | × | ⊗ | ○ | × | ○ |

| Remarks | ○: ON  ×: OFF  ⊗: SOL.ON: engine brake not applied  SOL.ON: engine brake applied | Engaged  Released  Engaged when engine brake is applied | Locked  Free  — |

CONTROL SYSTEM FOR SERVO HYDRAULIC PRESSURE OF TWO FRICTION ENGAGING MEANS DURING AN N-R SHIFT IN AUTOMATIC TRANSMISSION

BACKGROUND OF THE INVENTION

1) Field of the Invention

This invention relates to a control system for an automatic transmission, especially to a control system for servo hydraulic pressure adapted to have frictional engagement means engaged or released for changing the gear position of an automatic transmission.

2) Description of the Related Art

An automatic transmission mounted on a vehicle is generally provided with plural planetary gear mechanisms. Upon shifting the speed, shifting elements (gears, carriers, ring gears) of these planetary gear mechanisms are connected in accordance with engagement or release of frictional engagement means to establish a different power flow. In such transmissions, it has conventionally been conducted to provide a feed line of each frictional engagement means with an accumulator with a view toward reducing a shock caused upon engagement of the frictional engagement means, so that an increase in servo hydraulic pressure at the time of the engagement is controlled using the pressure-accumulating function of the accumulator.

In such an automatic transmission, it may be necessary, depending on the arrangement of planetary gear mechanisms, to simultaneously have frictional elements of plural frictional engagement means engaged upon change-over from a non-running range to a reverse range for backward running. Even if one attempts to achieve such simultaneous engagement by relying upon the pressure-accumulating function of accumulators as in the conventional technique, it is difficult as a matter of fact to synchronize the timings of engagement of the individual frictional elements because of variations in the piston strokes of servo means for the respective frictional engagement means. As a result, a rotational change occurs at the shifting part at every engagement of the frictional elements so that a shift shock takes place.

SUMMARY OF THE INVENTION

With the foregoing in view, the present invention has as a primary object the provision of a control system for servo hydraulic pressure in an automatic transmission, which system directly controls a part of feed of servo hydraulic pressure to frictional engagement means upon shifting to a reverse range so that engagement of one of the frictional engagement means is coincided with that of the other frictional engagement means to reduce a shift shock at the time of the shifting to the reverse range.

To overcome the above problem, the present invention therefore provides a control system for servo hydraulic pressure in an automatic transmission provided with planetary gear mechanisms disposed between an input shaft and an output shaft so that shifting elements of the planetary gear mechanisms can be connected under control by servo hydraulic pressure to establish a different power flow in accordance with engagement or release of frictional engagement means and hence to achieve plural speed stages, comprising:

first and second frictional engagement means engageable simultaneously in a reverse range, first and second servo pressure feed lines for feeding servo hydraulic pressure to said first and second frictional engagement means, respectively, a regulator valve disposed in the first servo pressure feed line to regulate the servo hydraulic pressure, a solenoid for controlling the regulator valve, an electronic control unit for outputting a signal to the solenoid so that the regulator valve is controlled by the signal, and a shift range detector for detecting shifting to the reverse range;

wherein the control of the regulator valve is conducted by the solenoid in accordance with an output from the electronic control unit upon detection of shifting to the reverse range by the shift range detector, whereby engagement of said first frictional engagement means is coincided with engagement of said second frictional engagement means.

In the servo hydraulic pressure control system of the present invention constructed as described above, the engagement of the second frictional engagement means is coincided with that of the first engagement means upon change-over to the reverse range. By simply absorbing any engagement shock of the engagement of the first engagement means in the engagement of the second frictional engagement means and hence smoothing the engagement of the second frictional engagement means as described above, the resulting shift shock can be reduced.

BRIEF DESCRIPTION OF THE DRAWINGS

The above and other objects, features and advantages of the present invention will become apparent from the following description and the appended claims, taken in conjunction with the accompanying drawings, in which:

FIG. 3 is a gear engagement diagram of the automatic transmission;

DETAILED DESCRIPTION OF THE INVENTION AND PREFERRED EMBODIMENT

Figure 1:
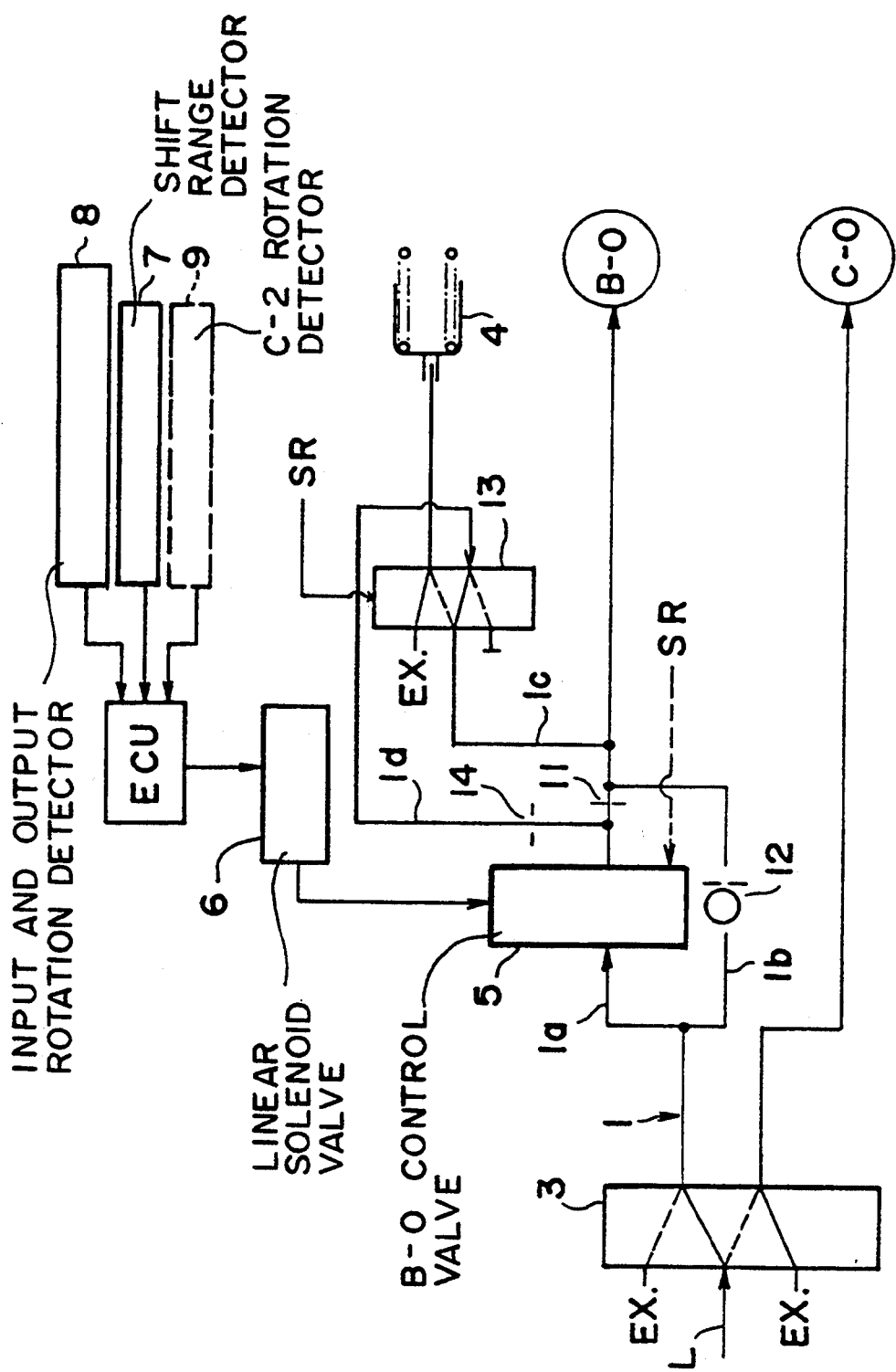
FIG. 1 is a schematic circuit diagram of a servo hydraulic pressure control system according to one embodiment of the present invention.

The servo hydraulic pressure control system according to the one embodiment of the present invention will hereinafter be described with reference to the accompanying drawings. The automatic transmission to which the servo hydraulic pressure control system of this invention is applied is a five-speed automatic transmission. As is understood from FIG. 2 which illustrates its gear train in skeleton, a 4-forward/1-reverse primary shifting unit M composed of a in-series train of three planetary gears is combined with an inlet-side overdrive planetary gear (hereinafter abbreviated as "overdrive unit") OD. Frictional engagement means which are simultaneously caused to engage in a reverse range are clutch C-2 and two brakes B-0, B-4.

Describing the outline construction first, the automatic transmission in the illustrated embodiment is provided, as in the conventional art, with the overdrive unit OD and the primary shifting unit M in addition to a torque converter T equipped with a lockup clutch. The overdrive unit OD has a clutch C-0 for connecting or disconnecting a carrier C0 and a sun gear S0 as well as the brake B-0 for holding a one-way clutch F-0 and the sun gear S0. The primary shifting unit M is provided with three sets of planetary gears P1,P2,P3 connected together in series, in which individual shifting elements (sun gears S1–S3, carriers C1–C3, ring gears R1–R3) making up the planetary gears are directly connected as needed. In association with the shifting elements of the individual gears, clutches C-1, C-2, brakes B-1 to B-4 and one-way clutches F-1,F-2 are arranged. Although not shown in the drawing, the individual clutches and brakes as the frictional engagement means are each provided, as in the convenreverse primary shifting unit M composed of an in-line train of three planetary gears is combined with an inlet-side overdrive planetary gear (hereinafter abbreviated as "overdrive unit") OD. Frictional engagement means which are simultaneously caused to engage in a reverse range are clutch C-2 and two brakes B-0, B-4.

Describing the outline construction first, the automatic transmission in the illustrated embodiment is provided, as in the conventional art, with the overdrive unit OD and the primary shifting unit M in addition to a torque converter T equipped with a lockup clutch. The overdrive unit OD has a clutch C-0 for connecting or disconnecting a carrier C0 and a sun gear S0 as well as the brake B-0 for holding a one-way clutch F-0 and the sun gear S0. The primary shifting unit M is provided with three sets of planetary gears P1,P2,P3 connected together in series, in which individual shifting elements (sun gears S1–S3, carriers C1–C3, ring gears R1–R3) making up the planetary gears are directly connected as needed. In association with the shifting elements of the individual gears, clutches C-1,C-2, brakes B-1 to B-4 and one-way clutches F-1,F-2 are arranged. Although not shown in the drawing, the individual clutches and brakes as the frictional engagement means are each provided, as in the convenshown in detail together with their associated parts in FIG. 5, those adapted to feed servo pressure to the clutch C-2 and the brake B-0 in the servo pressure control system for the automatic transmission are composed of a main pressure feed line 1 and a reverse range pressure feed line 2 in order to have the clutch C-2 and the brake B-0 engaged in the reverse (R) range.

In the illustrated embodiment, the gear train is in the overdrive state even in the reverse (R) range as described above. The main pressure feed line 1 for the brake B-0 is therefore connected to a main working oil feed line L for the hydraulic circuit via a 4–5 shift valve 3 which takes a part in the actuation of the overdrive upon achievement of a forward fifth speed. The main pressure feed line 1 is equipped with a feed line 1a, in which a small-diameter orifice 11 is disposed, and a return line 1b extending in parallel with the feed line 1a and having a check valve 12 therein, and is connected to an accumulator 4 via a line 1c branched out from a point downstream of the small-diameter orifice 11. Upon achievement of the forward fifth speed at which the normal overdrive is actuated, change-over of the 4–5 shift valve 3 by a signal from a solenoid SL3 therefore drains servo pressure from the clutch C-0 which locks the overdrive unit OD, and servo pressure to be fed to the brake B-0 is regulated by the accumulator 4.

The regulator valve which is an essential element in the system according to the present invention is interposed, as a B-0 control valve (hereinafter abbreviated as "control valve") 5, in the main pressure feed line 1 at a point upstream of the small-diameter orifice 11 and in parallel with the check valve 12. To be controlled by a solenoid, the control valve 5 has such a construction that it is actuated upon receipt, at a pressure-receiving portion thereof, a signal pressure regulated by a linear solenoid 6. Each signal adapted to control this linear solenoid 6 is a control signal for effecting a shift from neutral (N) to reverse (R) (hereinafter abbreviated as "N→R"). This control signal is generated from an electronic control unit ECU which also controls solenoids SL1-SL4 adapted to attain other speed stages. As a detection signal required to generate an N→R control signal from the electronic control unit ECU, a signal for a lowest shift range is needed. In the present invention, a shift range detector 7 is provided as this detector means. As the shift range detector 7, it is possible to use a neutral start switch which has conventionally been used for the detection of shift ranges. As a simple control method for performing the control of this invention only by such a shift signal, there is timer control.

The above construction is a construction which is at least required to materialize the present invention. In the present embodiment, other elements are also incorporated wit a view toward enhancing the advantageous effects of the present invention. Regarding the hydraulic circuit, a B-0 accumulator cut-off valve (hereinafter abbreviated as "cut-off valve") 13 is interposed in the branch line 1b to accelerate the rise of a servo pressure to be fed to the brake B-0, and a bypass line 1d having a large-diameter orifice 14 is disposed via the cut-off valve 13 in parallel with the small-diameter orifice 11. As elements for electronic control, on the other hand, there are provided an input/output rotation detector 8 for detecting the number of revolutions of an input shaft I and also the number of revolutions of an output shaft 0 as well as a C-2 rotation detector 9 for detecting rotation of the clutch C-2.

Figure 5:
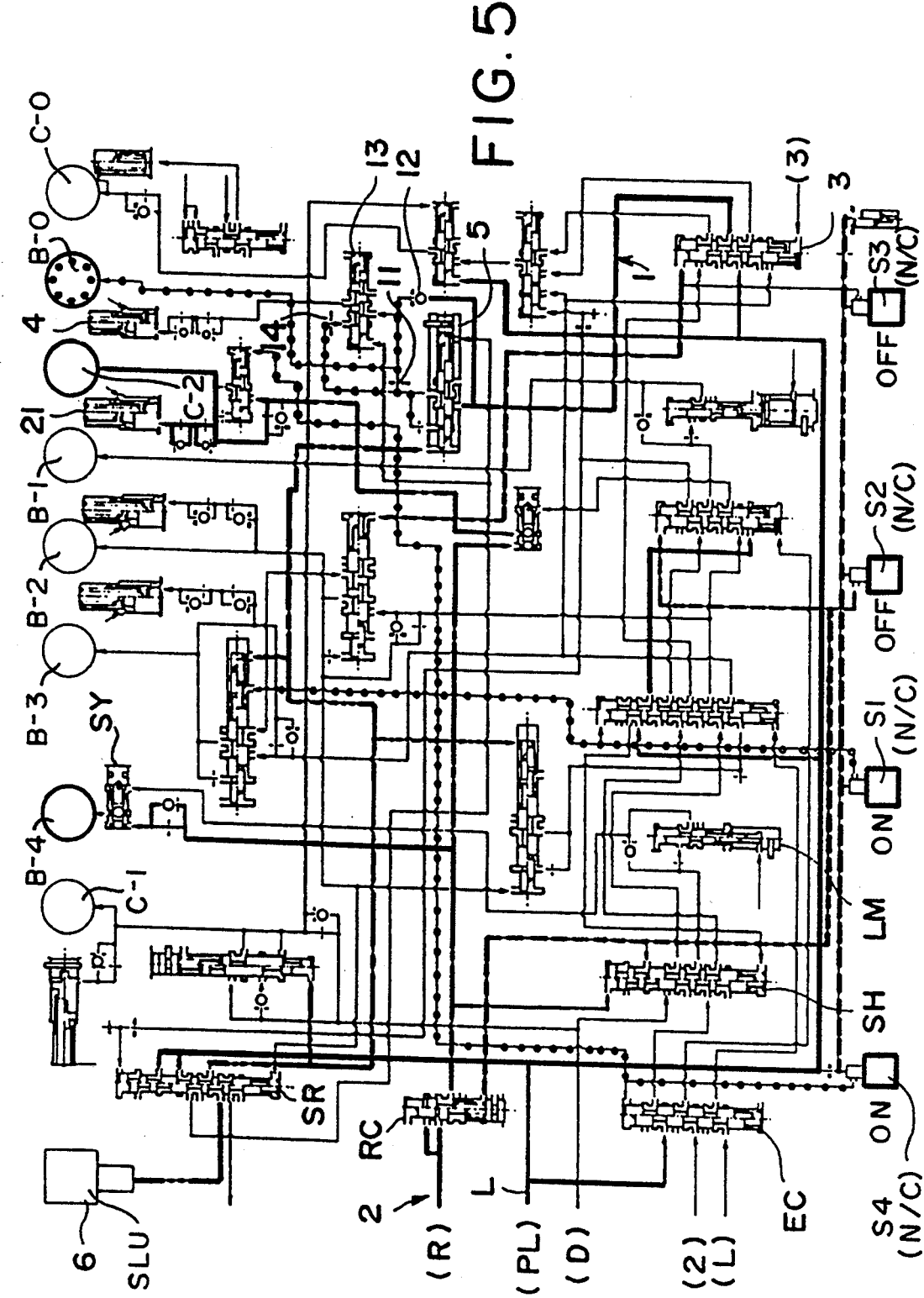
FIG. 5 is a fragmentary diagram of a hydraulic circuit of the automatic transmission.

As to the specific construction of each element, a circuit portion downstream of a manual valve is shown in detail in FIG. 5, in which elements of structure corresponding to those shown in FIG. 1 are designated by like reference numerals and their specific description is omitted herein.

Figure 4:
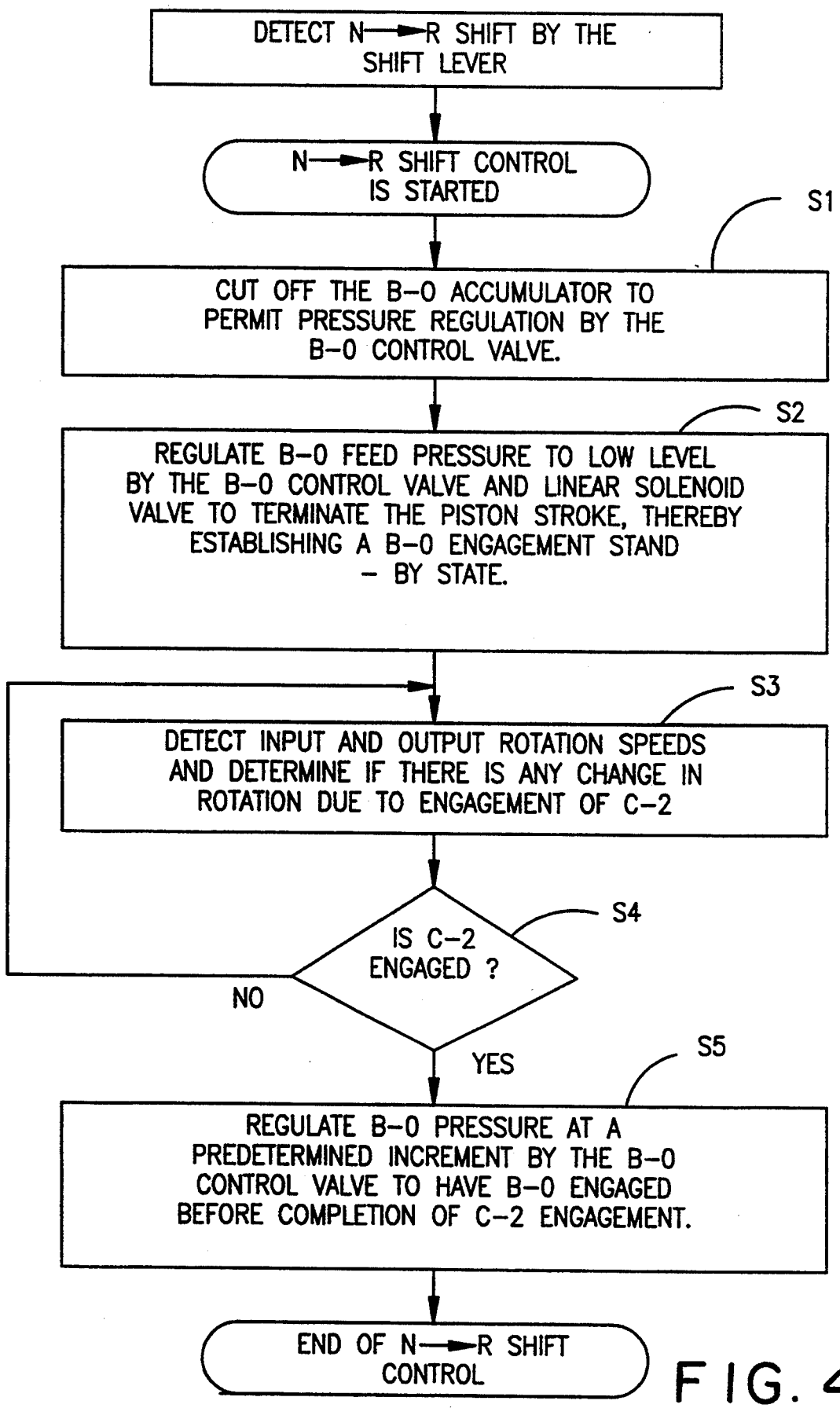
FIG. 4 is a flow chart of a control flow for the servo hydraulic pressure control system.

Operation of the illustrated embodiment constructed as described above will now be described in accordance with the control flow shown as a chart in FIG. 4 while additionally referring to other drawings. This flow starts upon detection of an N→R shift of a shift lever by the shift range detector 7. In a first step (S1), line pressure PL which is being applied to the pressure-receiving portion of the cut-off valve 13 is drained through a solenoid relay valve SR, whereby the cut-off valve 13 is changed over to the position shown in the upper half part (i.e., the hydraulic oil line indicated by the solid lines in FIG. 1) in FIG. 5 and a signal adapted to control the control valve 5 is also delivered from the electronic control unit ECU to the solenoid to initiate control of the control valve 5. The control valve 5 is applied with a line pressure via a solenoid relay valve SR so that the control valve 5 is locked on the open side in ranges other than the reverse (R) range (especially to prevent regulation of the servo pressure of the brake B-0 upon 4→5 shifting).

By the above control, the line pressure PL (which is indicated by thick solid lines in FIG. 5) fed through the 4→5 shift valve 5 is regulated at the control valve 5 and is fed to the brake B-0 via the small-diameter orifice 11 and along the lines indicated by dots in FIG. 5. The line pressure PL also begins to be fed to servo means of the brake B-0 along the bypass line 1d which extends through the large-diameter orifice 14 and the cut-off valve 13. To the clutch C-2, on the other hand, reverse range pressure R begins to be fed via a reverse control valve RC along lines, which is indicated by alternate long and short dash lines in FIG. 5, while accumulating pressure at a C-2 accumulator 21. To the brake B-4, engaging pressure which has been produced in advance by regulating, at a low modulator valve LM, the line pressure PL fed through an engine brake control valve EC and a 1-2 shift valve SH has been fed via a shuttle valve SY. This engaging pressure is now switched to the reverse range pressure R which is fed through the reverse control valve RC, whereby the reverse range pressure R is fed to the brake B-4 via the shuttle valve SY. At this time point, an input shaft IM of the main shifting unit M rotates at the same speed as turbine rotation of the torque converter T, whereas an output shaft OM of the main shifting unit M is in a rotation-stopped state.

In the next step (S2), the control valve 5 is controlled under low pressure owing to regulation by the linear solenoid 6 in accordance with a signal from the electronic control unit ECU, so that the piston of the brake B-0 is slowly stroked to an engagement initiating position and the brake B-0 is hence maintained in a standby state ready to immediately initiate engagement. On the other hand, the clutch C-2 begins to engage as the reverse range pressure R is accumulated in the C-2 accumulator 21.

In step S3, discrimination processing is performed at the electronic control unit ECU to determine whether or not the clutch C-2 has been brought into engagement. This determination is conducted on the basis of a reduction in the number of revolutions of the input shaft IM, said reduction being caused due to an increase in load as a result of the engagement of the clutch C-2, and a rise of rotation of the output shaft OM as a result of initiation of transmission of torque. Of the above reduction and the above rise, the detection of the rotation of the output shaft is useful fort the improvement of the detection accuracy but is not absolutely indispensable for the above discrimination. Alternatively, the discrimination can also be performed by directly determining engagement of the clutch C-2 with the C-2 rotation detector 9 depicted in FIG. 1.

In step S4, it is judged from the results of the above disorimination if the clutch C-2 has been brought into engagement. If "NO", the routine returns to step S3. If "YES", the servo pressure is regulated at a predetermined rate of increment by the control valve 5 so that the engagement of the brake B-0 is completed before the completion of the engagement of the clutch C-2. Although the rotation of the input shaft IM becomes overdrive rotation in this manner, the clutch C-2 still remains engaged. Accordingly, a shock due to the increase in rotation of the input shaft IM is absorbed in the engaging operation of the clutch C-2 under pressure regulated by the C-2 accumulator 21 so that no shock is produced by the engagement of the brake B-0. The engagement of the clutch C-2 is eventually completed, whereby the control of the N→R shift is completed.

Regarding the feed of hydraulic pressure during the control of the N→R shift, the feed of hydraulic pressure to the brake B-4 is effected along the reverse range pressure feed line 2 via the reverse control valve RC as indicated by thick solid lines in FIG. 5 which illustrates the hydraulic circuit in detail. Servo pressure is also fed from this line to the clutch C-2. On the other hand, the feed of servo pressure to the brake B-0 is effected from the main working oil feed line L. The line pressure PL is fed to the B-0 control valve 5 via the 4-5 shift valve 3 and, after being regulated there, is fed to the brake B-0 through the lines marked by dots in the drawing. In FIG. 5, alternate long and two dashes lines designate a line for each signal pressure regulated by the linear solenoid valve 6 whereas dashed lines and circled lines indicate lines for signal pressures applied by the solenoids SL1-SL4 to pressure-receiving portions of the corresponding valves.

Figure 2:
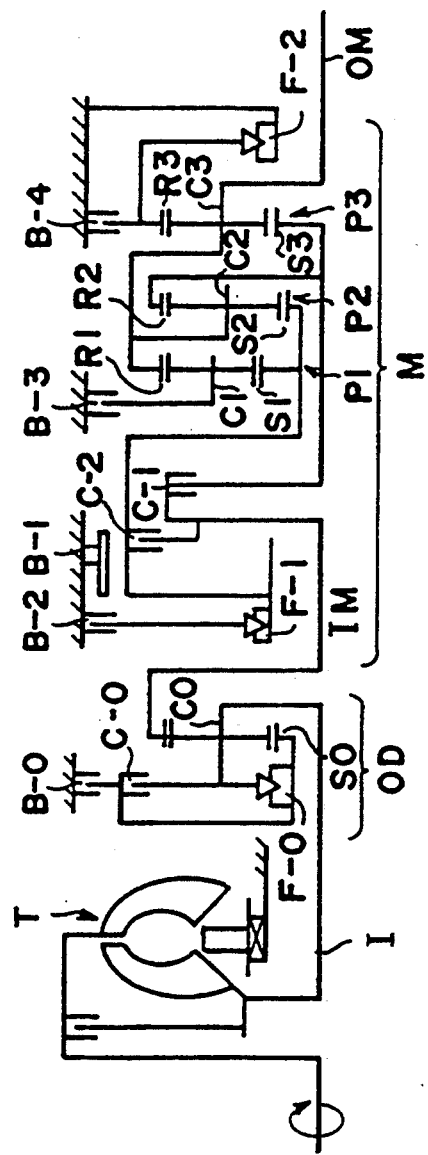
FIG. 2 is a skeleton diagram of an illustrative gear train of an automatic transmission controlled by the above system.

When the three frictional engagement means are caused to engage as described above, an input enters via the carrier C0 of the overdrive unit OD in the gear train shown in FIG. 2. The input is then outputted, as reaction force produced due to holding of the sun gear S0, from the ring gear R0. This overdrive rotation enters from the clutch C-2 of the primary shifting unit M to the sun gear S2 of the planetary gear P2. As a result of holding of the ring gear R3 of the planetary gear P3, reverse rotation decelerated by the combination of the planetary gears P2 and P3 is outputted from the carrier C3.

In the servo hydraulic pressure control system according to the above-described embodiment, an engaging operation for the brake B-0 of the overdrive unit OD as the first frictional engagement means is coincided with an engaging operation for the clutch C-2 of the main shifting unit M as the second frictional engagement means. Even if the input shaft IM undergoes overdrive rotation by the engaging operation for the brake B-0, any influence of the overdrive rotation is absorbed by an engaging operation for the clutch C-2 under the pressure accumulated at the corresponding accumulator without being transmitted directly to the rear-stage shifting elements P2,P3. As a consequence, it is possible to reduce N→R shift shocks.

The present invention has been described in detail based on one embodiment in which the present invention was applied to a five-speed automatic transmission. It is to be noted that apparatuses to which the present invention can be applied are not limited to such automatic transmissions. Other constructions including modifications to the respective elements described above can be suitably adopted within the scope of the claim.

We claim:

1. A control system for servo hydraulic pressure in an automatic transmission provided with first and second shifting units connected in series with each other, disposed between an input shaft and an output shaft so that shifting elements of the first and second shifting units can be connected under control by servo hydraulic pressure to establish a different power flow in accordance with engagement or release of frictional engagement means and hence to achieve plural speed stages, comprising:

first frictional engagement means for establishing a shift of the first shifting unit, second frictional engagement means for establishing a shift of the second shifting unit, said first and second frictional engagement means engagable simultaneously in a reverse range;

first and second servo pressure feed lines for feeding servo hydraulic pressure to said first and second frictional engagement means, respectively;

a regulator valve disposed in the first servo pressure feed line to regulate the servo hydraulic pressure;

a solenoid for outputting a signal pressure for controlling the regulator valve;

an initiating engagement detector for detecting initiating engagement of the second frictional engagement means, a shift range detector for detecting shifting to the reverse range, and electronic control means for outputting a control signal to the solenoid responsive to detection of shifting to the reverse range by said shift range detector, said regulator valve controlling engagement of the first frictional engagement means being responsive to said signal pressure to coincide with engagement of said second frictional engagement means as detected by said initiating engagement detector.

2. The control system of claim 1 wherein said signal from the electronic control unit regulates the servo hydraulic pressure of the first frictional engagement means at a first level when the shift range detector detects a shift to the reverse range, and increases the servo hydraulic pressure to said first frictional engagement means to a second level to engage said first frictional engagement means before completion of engagement of said second frictional engagement means, responsive to detection of initiating engagement of said second frictional engagement means by said initiating engagement detector.

3. The control system of claim 1 wherein said initiating engagement detector detects initiating engagement by monitoring rotation of the second frictional engagement means.

4. The control system of claim 1, further comprising a accumulator connected to the first servo pressure feed line between the first frictional engagement means and the regulator valve, and a cutoff valve disposed between the first servo pressure feed line and said accumulator for cutting off the accumulator from the first pressure feed line responsive to detection of shifting to the reverse range by said shift range detector.

* * * * *

UNITED STATES PATENT AND TRADEMARK OFFICE
CERTIFICATE OF CORRECTION

PATENT NO. : 5,351,577
DATED : October 4, 1994
INVENTOR(S) : ANDO et al

It is certified that error appears in the above-indentified patent and that said Letters Patent is hereby corrected as shown below:

On the title page, item [56]: Under "Foreign Patent Documents", "62-17458  11/1987" should read --62-17458  1/1987--.

Col. 3, delete the teaching beginning with "reverse primary shifting unit" at line 19 through "provided, as in the" in line 44 and substitute therefor:

--tional art, with servo means which has a piston to have a friction element of the corresponding frictional engagement means engaged or released under control by servo control pressure.

In the automatic transmission, as depicted by its partial gear engagement diagram shown in FIG. 3, the clutches C-1,C-2 which take a part in the transmission of drive power are released in non-running ranges, i.e., the parking range (P)

UNITED STATES PATENT AND TRADEMARK OFFICE
CERTIFICATE OF CORRECTION

PATENT NO. : 5,351,577
DATED : October 4, 1994
INVENTOR(S) : ANDO et al

It is certified that error appears in the above-indentified patent and that said Letters Patent is hereby corrected as shown below:

and the neutral (N) range, whereby no transmission of drive power takes place in the primary shifting unit M. To shift the automatic transmission from the above gear position to the reverse (R) range, the clutch C-2 and the brake B-4 are caused to engage (it is to be noted that the brake B-4 is also in an engaged state in the non-running ranges in the illustrated embodiment) and the brake B-0 is also engaged so that the overdrive unit OD is actuated.

As parts of the circuit construction, the parts pertaining to the present invention, are selectively and schematically illustrated in FIG. 1 and are also--.

UNITED STATES PATENT AND TRADEMARK OFFICE
CERTIFICATE OF CORRECTION

PATENT NO. : 5,351,577
DATED : October 4, 1994
INVENTOR(S) : ANDO et al

It is certified that error appears in the above-indentified patent and that said Letters Patent is hereby corrected as shown below:

Col. 5, line 56, "disorimination" should read --discrimination--

Signed and Sealed this

Twenty-seventh Day of June, 1995

Attest:

BRUCE LEHMAN

Attesting Officer

Commissioner of Patents and Trademarks